US012644194B2

(12) United States Patent
Zhang et al.

(10) Patent No.: US 12,644,194 B2
(45) Date of Patent: Jun. 2, 2026

(54) PREPARATION METHOD OF ELECTROPLATED PART AND ELECTROPLATED PART

(71) Applicant: Tyco Electronics (Shanghai) Co., Ltd., Shanghai (CN)

(72) Inventors: Daiqiong (Diana) Zhang, Shanghai (CN); Jialin Zhang, Shanghai (CN); Wenzheng Ma, Suzhou (CN); Weidong Zhang, Shanghai (CN); Zhongxi Huang, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 57 days.

(21) Appl. No.: 18/537,279

(22) Filed: Dec. 12, 2023

(65) Prior Publication Data

US 2024/0191384 A1 Jun. 13, 2024

(30) Foreign Application Priority Data

Dec. 13, 2022 (CN) .......................... 202211603878.5

(51) Int. Cl.
| | |
|---|---|
| *C25D 3/56* | (2006.01) |
| *C01B 32/205* | (2017.01) |
| *C25D 5/12* | (2006.01) |
| *C25D 5/18* | (2006.01) |
| *C25D 5/48* | (2006.01) |
| *C25D 13/02* | (2006.01) |
| *C25D 15/02* | (2006.01) |

(52) U.S. Cl.
CPC .............. *C25D 3/56* (2013.01); *C01B 32/205* (2017.08); *C25D 5/12* (2013.01); *C25D 5/18* (2013.01); *C25D 5/48* (2013.01); *C25D 15/02* (2013.01); *C25D 13/02* (2013.01)

(58) Field of Classification Search
CPC ... C25D 9/08; C25D 9/10; C25D 3/22; C25D 3/24; C25D 5/18
See application file for complete search history.

(56) References Cited

U.S. PATENT DOCUMENTS

| | | | | |
|---|---|---|---|---|
| 6,904,658 B2 * | 6/2005 | Hines | ........................ | C25D 1/00 205/112 |
| 8,846,208 B2 * | 9/2014 | John | ........................ | C25D 5/18 205/112 |
| 2004/0154925 A1 * | 8/2004 | Podlaha | ................ | C25D 5/625 205/104 |

FOREIGN PATENT DOCUMENTS

| | | | | | |
|---|---|---|---|---|---|
| GB | 2134543 A | * | 8/1984 | ............... | C25D 3/22 |
| WO | WO-03057359 A2 | * | 7/2003 | ............... | C09C 1/24 |

* cited by examiner

*Primary Examiner* — Brian W Cohen
(74) *Attorney, Agent, or Firm* — Barley Snyder

(57) ABSTRACT

A preparation method of an electroplated part includes the steps of plating a porous metal coating layer, placing the porous metal coating layer in a graphite colloid, and depositing graphite colloidal particles into the porous metal coating layer. The porous metal coating layer is plated at or proximate an outer side of a substrate of the electroplated part. The graphite colloidal particles are deposited into pores of the porous metal coating layer from the graphite colloid to form a graphite alloy coating layer.

16 Claims, 2 Drawing Sheets

400

400

| Sealing layer 406 |
| --- |
| |
| Graphite alloy coating layer 404 |
| |
| Substrate 402 |

PREPARATION METHOD OF ELECTROPLATED PART AND ELECTROPLATED PART

CROSS-REFERENCE TO RELATED APPLICATION

This application claims the benefit of Chinese Patent Application No. CN202211603878.5 filed on Dec. 13, 2022, in the State Intellectual Property Office of China, the whole disclosure of which is incorporated herein by reference.

FIELD OF THE INVENTION

The disclosure relates to the field of electroplating, more particularly, to a preparation method of electroplated part and electroplated part.

BACKGROUND

Various metal coatings are widely used in consumer electronics, healthcare, locomotives, aviation, and navigation components. Different metal coatings are chosen based on their functional requirements such as decoration, anti-corrosion, weldability, conductivity, thermal conductivity, and wear resistance. With the rapid development of mechanical and electronic component performance, the demand for coatings has gradually shifted from conventional single function to strict multifunctional, mainly summarized as excellent conductivity and thermal conductivity, as well as multifunctional durability against electricity, heat, wear, and corrosion. For example, rapid charging of mobile phones requires an increase in charging current, which leads to heating-generate and heating-up. This requires that the coatings of the charging head not only has good conductivity, but also has heat resistance and thermal conductivity. Frequent charging and unplugging also requires the coatings of the charging head to be wear-resistant. More stringent are the large charging stations of electric vehicles, where charging heads are often exposed to sunlight, rain, strong winds, and sand dust outdoors. In addition to conducting electricity, conducting heat, and being wear-resistant, they also require corrosion and weather resistance. Other application of coatings, such as in wind power generation, high-speed motors, photovoltaics, new energy, etc., which are applied in light, electricity, heat, chemistry, power, and harsh environments, are also facing increasing challenges.

At present, there are two methods for obtaining multifunctional durable coatings: stacking and alloying. Stacking refers to the use of metal coatings with different functions, layer by layer. For example, using nickel coating as a base under the gold coating can increase overall wear resistance, adding lubricating oil to various coatings surface can increase wear resistance, and adding sealing agents can increase corrosion resistance. Moreover, the rapid charging coating of mobile phones uses five coatings, including nickel, nickel-tungsten, gold, palladium, rhodium-ruthenium, to stack, the bonding strength between these stacked layers has always been a challenge and the electroplating process is also lengthy and complex. Alloying refers to co deposition of multiple metals or co deposition of metals and non-metals in a single coating. For example, gold-cobalt alloy electroplating can replace pure gold electroplating to increase wear resistance, zinc-nickel-iron alloy electroplating can replace pure zinc plating to increase weather resistance, and co deposition of metals with diamond powder or silicon-aluminum-titanium ceramic powder can increase hardness. However, these alloys can weaken other properties while increasing certain properties, such as the conductivity and corrosion resistance of gold-cobalt are not as good as pure gold, metallic and non-metallic alloys lose some of the thermal and conductive properties of the metal, and the electroplating process of the alloy itself is also more difficult to control.

In recent years, graphite and graphene have become hot spots in the field of material research. Adding micron or nano particles of graphite or graphene to the metal coating can increase the lubrication and wear resistance of the coating, such as the electroplating of tin graphite alloy, silver graphite alloy and nickel graphite alloy, etc. The experimental results have shown low friction coefficients, and excellent electric conductivity, thermal conductivity, and weather resistance. However, due to the non-polarity of graphite structures, it does not have hydrophilicity and is difficult to dissolve, disperse, and adsorb with metals in the plating solution, its preparation process with metal alloys is very unstable, graphite separates and precipitates in the plating solution, and often needs to be filtered and cleaned before being added. In addition, free graphite dust itself will endanger human health (long-term inhalation will lead to allergic asthma and pneumoconiosis). The final deposition quality of metal graphite is also unstable. Specifically, the graphite content in the coating is uneven, the graphite is easy to be distributed in the shallow surface of the coating, the coating adhesion also decreases due to the increase of graphite content, and the deposition efficiency is also very low.

Currently, the electroplating of metal graphite alloy involves dispersing nano and micrometer sized graphite particles into a certain metal plating solution using dispersants. Under high strength stirring or rapid liquid flow circulation and direct current action, metal ions undergo reduction reactions while co depositing graphite particles onto the substrate. Its drawbacks include, but are not limited to: 1) the working window of the plating solution is narrow; 2) the efficiency is low; 3) the coating thickness is limited (the current density that can be withstood is only 5-10% of that of single metal electroplating, as the deposition thickness increases, the deposition potential increases, and the dense uniformity and the adhesion of the coating decrease, therefore, it is not suitable to use higher deposition thicknesses); 4) difficulty in maintenance and management of plating solution (compared with dispersants adsorbed on solid graphite particles, dispersants are more likely to chelate or even precipitate metal ions in the plating solution, while increasing the resistance or even plating resistance of the plating system, graphite particles also aggregate due to dispersant loss, in order to maintain a balance between basic plating ability and fleeting graphite dispersion, adding metal ions or dispersants alone is far from enough, must frequently update fresh pre mixed plating solution); 5) difficulty in controlling the stability of coating quality (graphite particles are unevenly distributed in the coating and tend to aggregate in the shallow surface, and graphite is only physically wrapped with surrounding metals, which is prone to cracking and leaving gaps, resulting in loose and fragile coating); 6) safety hazards (the use of free graphite particles in the plating solution can harm human health, and long-term inhalation can cause allergic asthma and pneumoconiosis), for example, loose graphite particles in the coating may float in the air or fall into adjacent components due to wear and tear during use, posing a threat to human health and disrupting the performance of precision electronic components; and 7) it is in the experimental and sample stage at present with little industrialization (experimental samples are only suitable for low-speed hanging plating of loose parts, and do not have the ability be used in high-speed continuous plating or barrel plating and rack plating of loose parts).

SUMMARY

According to an embodiment of the present disclosure, a preparation method of an electroplated part includes the steps of plating a porous metal coating layer, placing the porous metal coating layer in a graphite colloid, and depositing graphite colloidal particles into the porous metal coating layer. The porous metal coating layer is plated at or proximate an outer side of a substrate of the electroplated part. The graphite colloidal particles are deposited into pores of the porous metal coating layer from the graphite colloid to form a graphite alloy coating layer.

BRIEF DESCRIPTION OF THE DRAWINGS

The invention will now be described by way of example with reference to the accompanying Figures, of which.

DETAILED DESCRIPTION OF THE EMBODIMENTS

Figure 1:
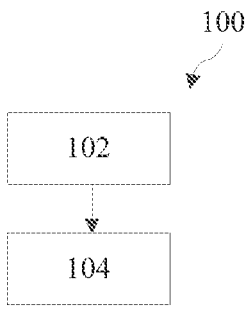
FIG. 1 is a schematic view of an example flow path of a preparation method of electroplated part according to an embodiment of the disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As shown in FIG. 1, a schematic view of the flow path of a preparation method 100 of electroplated part is proposed in an embodiment of the present disclosure. The preparation method 100 of electroplated part comprises the following steps:

Step 102, plate a porous metal coating layer at the outer side of the substrate of the electroplated part. The porous metal coating can be a single-metal coating or multi-metal coating, can be a single-layer coating or a multi-layer coating. The pores of the porous metal coating should be controlled within the size range of graphite colloidal particles to facilitate the subsequent electrodeposition and physical adsorption of graphite colloidal particles of the graphite colloid. Optionally, the porous metal coating can include one or more of gold, silver, tin, nickel, silver-tin, gold-cobalt, and palladium-nickel. If the porous metal coating layer is a single-layer coating, the single-layer coating can be a single-metal coating or an alloy coating. If the porous metal coating layer is a multi-layer coating, it can be a stack of same metal layers or different metal layers.

Step 104, place the porous metal coating layer in a graphite colloid for electroplating, so that graphite colloidal particles in the graphite colloid are deposited in pores of the porous metal coating layer to form a graphite alloy coating layer. The graphite alloy coating layer can be a single-layer coating or a multi-layer coating.

In a preferred example of the present embodiment, the step of plating a porous metal coating layer at the outer side of the substrate of the electroplated part includes: 1) plate a non-porous metal coating layer at the outer side of the substrate of the electroplated part; and 2) plate the porous metal coating layer at the outer side of the non-porous metal coating layer. The step of plating a non-porous metal coating layer on the preprocessed substrate or intermediate coating layer could block the oxidation of the substrate quickly, provide a similar bonding structure and reduce surface tension for the subsequent porous metal coating to ensure sufficient bonding strength.

Furthermore, in a preferred example of the present embodiment, the method includes stacking the non-porous metal coating and the graphite alloy coating sequentially and repeatedly at the outer side of the substrate of the electroplated part to the desired stacking thickness. Specifically, repeating the process of plating a non-porous metal coating, plating a porous metal coating, depositing the graphite colloid, and removing the loose graphite particles on the surface, thus the thickness of the plating is unrestricted. Therefore, it is easier to obtain the required coating structure and achieve the desired coating functions, such as conductivity, thermal conductivity, wear resistance, corrosion resistance, and weather resistance.

In a preferred example of the present embodiment, the step of plating the porous metal coating layer in a graphite colloid includes place the porous metal coating in a graphite colloid and processing it with pulse electroplating technology, to deposit graphite colloidal particles in the pores of the porous metal coating layer. In other examples, direct current electroplating can also be used to deposit graphite colloidal particles into the pore of porous metal coatings. Pulse electroplating can reach the peak value of current density up to 100 times which can broaden the working window and improve the working efficiency.

In a preferred example of the present embodiment, plating a porous metal coating layer at the outer side of the substrate of the electroplated part includes: 1) placing the substrate of the electroplated part in the metal plating solution; and 2) using the bidirectional pulse electroplating technology, forming the porous metal coating layer with pores at the outer side of the substrate of the electroplated part. The bidirectional pulse electroplating technology allows the porous metal coating to form more evenly distributed pores, which is beneficial for the distribution uniformity of graphite particle deposition and improving the wear resistance of the coating, and so on.

In some examples, the substrate of the electroplated part is placed in a metal plating solution containing an emulsion dispersion for electroplating, thus, to form the porous metal coating at the outer side of the substrate of the electroplated part. Specifically, the acquisition of the porous metal coating can be achieved by adding appropriate emulsion dispersion (anions) to the metal plating solution, the emulsion dispersion continuously forms many micron or nanoscale insulation points on the surface of the workpiece without electrodeposition of metal, thus forming micropores with negative charge. The micropore with negative charge can attract graphite colloidal particles with positive charge graphite particles to be deposited and embed in them. The preparation technology of this porous metal coating is mature and has great feasibility for industrial mass production.

In some examples, the configuration method of the graphite colloid includes: 1) obtaining uniform and stable palladium core colloids; 2) mixing micron and/or nanoscale graphite particles into the palladium core colloid; and 3) stirring to make the graphite particles fully adsorb the palladium core colloid to obtain the graphite colloid. In other examples, the palladium core colloid mentioned above can be replaced by other type of colloid (such as gelatin), and graphite particles can be mixed in to prepare the required graphite colloid. In this example, graphite particles are made into charged colloid with stable and excellent dispersibility, which enables graphite particles to penetrate and deposit into micropores of the metal film, thus solves the defect of loose and voids in the combination of the graphite and the metal group. In some examples, sealing treatment is performed on the graphite alloy coating, for example, seal the exposed graphite with metal sealing coating and/or organic sealing agent. The colloidization of graphite particles and the superposition design of closed-loop dense coating reduce the harm of allergic asthma and pneumoconiosis caused by human inhalation of graphite particles, as well as reduce the pollution risk of graphite particles floating in the air after wear and tear.

In this embodiment, metal and graphite particles are electrodeposited separately, and the dispersant only acts on the graphite particles, therefore have no instability of agglomeration and precipitation compared with the plating solution with metal ion. Graphite particles are made into charged colloid with excellent dispersion and stability and could infiltrate and be deposit into micropores of the metal film when driven by pulse potential with high current density. The combination of the graphite particle and the metal is not a simple physical binding, but a joint effect of van der Waals force and physical binding resulting in a tight binding, thus solves the defect of loose and voids in the combination of the graphite and the metal group. It can be applied to various electroplating process design, like high-speed continuous plating or rack/barrel plating of loose parts. The acquisition of porous metals can be achieved by adding appropriate emulsion dispersion to the metal plating solution, for which there are currently mature industrial mass production solutions available. Pulse electroplating can reach the peak value of current density up to 100 times, which can be applied to the deposition of colloidal graphite and porous metal to broaden the working window and improve the work efficiency. And the process of non-porous metal→porous metal→graphite→removal of surface graphite can be repeated until the desired stacking thickness is obtained, so that the deposition thickness is not limited. The gelatinization of graphite particles and the closed-loop dense coating stacking design further reduce the harm of allergic asthma and pneumoconiosis caused by inhaling graphite particles in the human body, as well as the pollution risk of graphite particles floating in the air after wear and tear. Besides, the colloidization of graphite particles and the superposition design of closed-loop dense coating reduce the harm of allergic asthma and pneumoconiosis caused by human inhalation of graphite particles, as well as reduce the pollution risk of graphite particles floating in the air after wear and tear.

Figure 2:
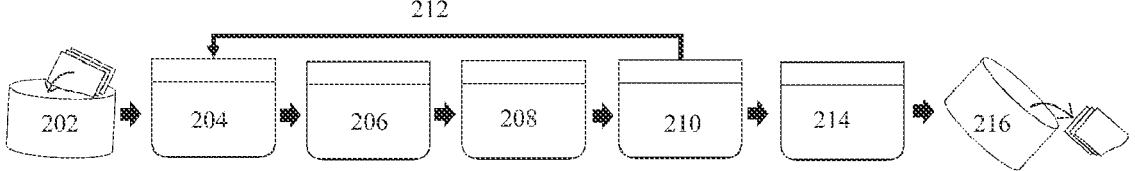
FIG. 2 is a schematic view of an example flow path of a preparation method of electroplated part based on barrel plating and rack plating of loose parts according to an embodiment of the disclosure.
Figure 3:
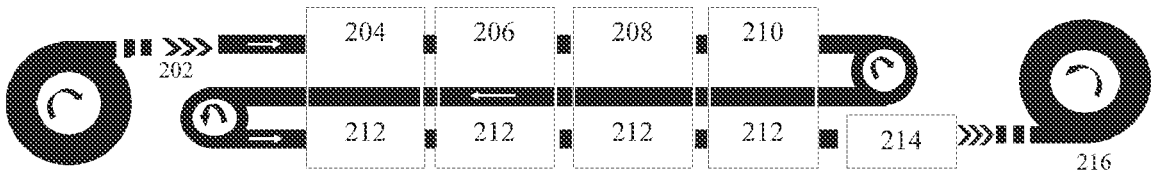
FIG. 3 is a schematic view of an example flow path of a preparation method of electroplated part based on high-speed continuous plating according to an embodiment of the disclosure.

The following is an example of a gold-graphite alloy to specify the method for mass production (also suitable for silver-graphite, tin-graphite, nickel-graphite, etc., or metal alloy graphite, for example the composite of binary or poly alloy plating with graphite, such as silver-tin graphite, gold-cobalt graphite, palladium-nickel graphite). FIG. 2 is a schematic diagram of the preparation process of the electroplated part based on rack/barrel plating of loose part, and FIG. 3 is a schematic diagram of preparation process of the electroplated part based on high-speed continuous plating. The steps of the two-preparation process may be elaborated as follows.

Step 202, unreeling and loading: same as the existing electroplating method, hang the workpiece on the hanger or transfer it to the roller if it is the electroplating of the loose part, and unreel the coil to enter the electroplating line if it is the continuous material belt or the transfer belt to carry the material. Same as the existing mature electroplating lines, the present electroplating line also has pre-treatments, such as oil removal, oxidation removal, water washing, blow drying, baking, and also has other single metal coating or alloy coating in the middle. The continuous strip plating can be done with either a linear or an S-shaped wire body (as shown in FIG. 3). When using the S-shaped wire body, the same process can share a common solution storage tank.

Step 204, gold flash plating and activation: flash plate thin gold (for example, around 20 nm) on the fresh substrate or intermediate coating treated above, which could block the oxidation of the substrate quickly, provide a similar bonding structure and reduce surface tension for the subsequent porous metal coating to ensure sufficient bonding strength.

Step 206, porous gold plating: the acquisition of the porous gold coating can be achieved by adding appropriate emulsion dispersion (anions) to the gold plating solution, the emulsion dispersion continuously forms many micron or nanoscale insulation points on the surface of the workpiece without electrodeposition of metal, thus forming micropores with negative charge. The bidirectional pulse electroplating technology could be used to obtain evenly distributed through micropores, and the coating is controlled within the size range of the graphite particle for the subsequent electrodeposition and physical adsorption of colloidal graphite.

Step 208, the deposition of colloid graphite: prepare the acidic colloid solution of stannous chloride-palladium chloride in advance, mix it with anionic dispersant such as sodium hexametaphosphate or sodium stannate to obtain uniform and stable colloid, or buy the commercially available colloid palladium and adjust the concentration ratio of $Sn^{2+}/Pd^{2+}$ (tin ion/palladium ion) to obtain the palladium core colloid as small as possible. Mix in micro and nanoscale graphite particles and mix them thoroughly to ensure that each graphite particle fully adsorbs the palladium core colloid to form positively charged graphite colloid, which can be physically adsorbed by micropores of negatively charged porous gold (for example, 5-10 minutes slowly), or rapidly infiltrated and electrodeposition under the action of low duty cycle pulse current (for example, 5-10S). During the electrodeposition process, it is inevitable that trace amounts of tin, palladium, and phosphorus co deposited with gold in the colloidal solution. Therefore, the composite coating finally obtained would be a multi-element alloy mainly composed of gold and graphite, where the proportion of graphite in the coating depends on the porosity of the porous gold.

Step 210, etching for dispergation and deashing: dissolve the colloid in dilute hydrochloric acid (or other colloid dissolving solution) and remove the colloid dissolving products such as $Pd^{2+}$ and $Sn^{2+}$, and remove the loose graphite particles on the surface of porous gold.

Step 212, repeating steps 202 to 210 until the target thickness is obtained: when the above steps are repeated, the stacked layers can not only be stacked with the same type of graphite alloy coating layer and non-graphite alloy coating layer, but also can be stacked with different types of single-layer or multi-layer coatings according to application requirements. For example, the first layer of graphite alloy uses silver graphite, the middle layer uses gold graphite, and the surface layer uses palladium nickel graphite with higher hardness. Each graphite alloy layer can also be the sum of multiple layers of different graphite alloys, for example, the stack of a silver-graphite layer and a tin-graphite layer can also be considered as a layer of graphite alloy. Similarly, different non-graphite alloy layers can also be selected as interval layer or stacked layer, for example, the silver plating, the gold plating, the tin plating, the silver-tin plating, and the platinum plating.

Step 214, sealing with flashing gold or organic sealing agent to seal some exposed graphite.

Step 216, unloading or reeling: same as the existing electroplating method, take the workpiece out of the hanger or drum when it is a loose part and has been plated and dried, or roll the workpiece up when it is carried on a continuous material belt or conveyor belt.

In the preparation method of electroplated part, metal and graphite particles are electrodeposited separately, and the dispersant only acts on the graphite particles, therefore have no instability of agglomeration and precipitation compared with the plating solution with metal ion. Graphite particles are made into charged colloid with excellent dispersion and stability, and during the electroplating treatment, graphite particles in graphite colloid could infiltrate and be deposit into micropores of the porous metal coating. The combination of the graphite particle and metal is not a simple physical binding, but a joint effect of van der Waals force and physical binding resulting in a tight binding, thus solves the defect of loose and voids in the combination of the graphite and the metal group. It can be applied to various electroplating process design, like high-speed continuous plating or rack/barrel plating of loose parts.

Figure 4:
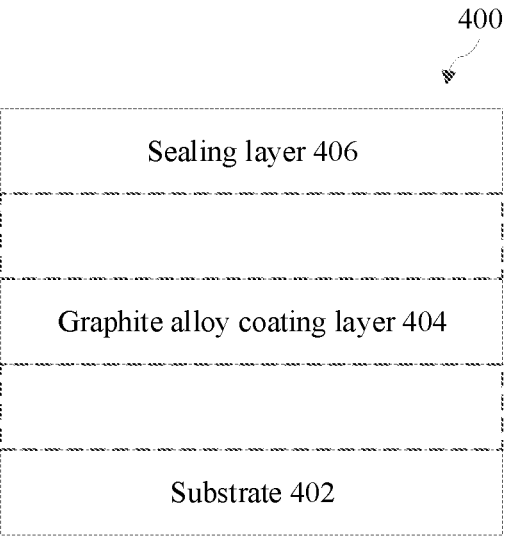
FIG. 4 is a schematic view of an example structure of an electroplated part according to an embodiment of the disclosure.

As shown in FIG. 4, another embodiment of the present invention proposes a structural schematic diagram of an electroplated part 400. The electroplated part 400 includes a substrate 402 and a graphite alloy coating layer 404. The preparation method of the graphite alloy coating includes: 1) plating a porous metal coating layer at the outer side of the substrate of the electroplated part; and 2) placing the porous metal coating layer in a graphite colloid for electroplating, so that the graphite colloidal particles in the graphite colloid are deposited in the pores of the porous metal coating to form a graphite alloy coating. In some examples, there is the non-porous metal coating layer plated between the graphite alloy coating layer 404 and the substrate 402 to block the oxidation of the substrate quickly, provide a similar bonding structure and reduce surface tension for the subsequent porous metal coating layer to ensure sufficient bonding strength. In some examples, the non-porous metal coating layer and the graphite alloy coating layer are stacked sequentially and repeatedly at the outer side of the substrate 402 to obtain the electroplated part with desired stacking thickness. In some examples, a sealing layer 406 is disposed at the outer side of the graphite alloy coating layer to reduce the harm of allergic asthma and pneumoconiosis caused by human inhalation of graphite particles, as well as reduce the pollution risk of graphite particles floating in the air after wear and tear. This embodiment is similar to the implementation of the preparation method 100 of electroplated parts mentioned earlier, so there is no further elaboration.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A preparation method of an electroplated part, comprising:
   plating a porous metal coating layer at an outer side of a substrate of the electroplated part; and
   placing the porous metal coating layer in a graphite colloid for electroplating, wherein formation of the graphite colloid includes:
      obtaining a uniform and stable palladium core colloid;
      adding graphite particles into the palladium core colloid; and
   depositing graphite colloidal particles of the graphite colloid into pores of the porous metal coating layer to form a graphite alloy coating layer.

2. The preparation method of the electroplated part of claim 1, further comprising plating a non-porous metal coating layer on the substrate.

3. The preparation method of the electroplated part of claim 2, wherein the plating of the non-porous metal coating layer includes plating the non-porous metal coating layer on the outer side of the substrate of the electroplated part.

4. The preparation method of the electroplated part of claim 3, wherein the plating of the porous metal coating layer includes plating the porous metal coating layer on an outer side of the non-porous metal coating layer.

5. The preparation method of the electroplated part of claim 4, further comprising repeating, in sequence until a desired coating thickness is achieved:

the plating of the non-porous metal coating layer;

the plating of the porous metal coating layer; and the depositing of the graphite particles.

6. The preparation method of the electroplated part of claim 1, wherein the porous metal coating layer includes one or more of gold, silver, tin, nickel, silver-tin, gold-cobalt, and palladium-nickel.

7. The preparation method of the electroplated part of claim 1, wherein the depositing of the graphite colloidal particles includes processing the porous metal coating layer in the graphite colloid with pulse electroplating technology.

8. The preparation method of the electroplated part of claim 1, wherein the plating of the porous metal coating layer at the outer side of the substrate of the electroplated part includes:

placing the substrate of the electroplated part in a metal plating solution; and using bidirectional pulse electroplating technology, forming the porous metal coating layer with pores at the outer side of the substrate of the electroplated part.

9. The preparation method of the electroplated part of claim 1, wherein the plating of the porous metal coating layer at the outer side of the substrate of the electroplated part includes placing the substrate of the electroplated part in a metal plating solution containing emulsion dispersion for electroplating so as to form the porous metal coating layer at the outer side of the substrate of the electroplated part.

10. The preparation method of electroplated part of claim 1, wherein the adding graphite particles into the palladium core includes mixing at least one of micron or nanoscale graphite particles into the palladium core colloid.

11. The preparation method of electroplated part of claim 10, wherein the formation of the graphite colloid further includes stirring the palladium core colloid and the graphite particles such that the graphite particles fully adsorb the palladium core colloid to obtain the graphite colloid.

12. The preparation method of electroplated part of claim 1, further comprising performing sealing treatment on the graphite alloy coating layer with at least one of a metal sealing coating or an organic sealing agent to seal exposed graphite.

13. A preparation method of an electroplated part, comprising:

plating a non-porous metal coating layer on an outer side of the substrate of the electroplated part;

plating a porous metal coating layer on an outer side of the non-porous metal coating layer; and placing the porous metal coating layer in a graphite colloid for electroplating, wherein the graphite colloid is formed by:

adding graphite particles to a stable palladium core colloid; and causing the graphite particles to fully absorb the palladium core colloid; and depositing graphite colloidal particles of the graphite colloid into pores of the porous metal coating layer to form a graphite alloy coating layer.

14. The preparation method of the electroplated part of claim 13, wherein the depositing of the graphite colloidal particles includes pulse electroplating the porous metal coating layer in the graphite colloid.

15. The preparation method of the electroplated part of claim 13, wherein the step of causing the graphite particles to fully absorb the palladium core colloid includes mixing the graphite particles and the stable palladium core colloid.

16. The preparation method of the electroplated part of claim 13, further comprising sealing the graphite alloy coating layer with at least one of a metal sealing coating or an organic sealing agent.

* * * * *